United States Patent [19]

Lovy et al.

[11] Patent Number: 5,252,692

[45] Date of Patent: * Oct. 12, 1993

[54] HYDROPHILIC ACRYLIC COPOLYMERS AND METHOD OF PREPARATION

[75] Inventors: Jan Lovy, Plainsboro, Township, Middlesex County; Vladimir A. Stoy, Princeton, both of N.J.

[73] Assignee: Kingston Technologies, Inc., Dayton, N.J.

[*] Notice: The portion of the term of this patent subsequent to Jul. 24, 2007 has been disclaimed.

[21] Appl. No.: 617,177

[22] Filed: Nov. 23, 1990

[51] Int. Cl.$^5$ .................. C08F 220/52; C08F 8/32
[52] U.S. Cl. .................. 526/342; 525/329.1; 525/329.2; 525/329.3; 525/379; 525/418; 526/310; 526/317.1; 526/341; 528/363
[58] Field of Search .............. 526/310, 342, 341; 525/379; 528/363

[56] References Cited

U.S. PATENT DOCUMENTS

| | | | |
|---|---|---|---|
| 3,200,102 | 8/1965 | Kleiner | 260/88.7 |
| 3,897,382 | 7/1975 | Stoy et al. | 260/29.6 |
| 3,926,930 | 12/1975 | Ohfuka et al. | 260/85.5 |
| 4,062,787 | 12/1977 | Jolivet | 252/51.5 A |
| 4,107,121 | 8/1978 | Stoy | 260/29.6 |
| 4,198,497 | 4/1980 | Jolivet | 526/310 |
| 4,254,250 | 3/1981 | Glowaky | 525/350 |
| 4,337,327 | 6/1982 | Stoy | 525/280 |
| 4,379,874 | 4/1983 | Stoy | 524/27 |
| 4,420,589 | 12/1983 | Stoy | 525/93 |
| 4,564,659 | 1/1986 | Kataoka | 525/328.2 |
| 4,943,618 | 7/1990 | Stoy | 525/340 |

Primary Examiner—Joseph L. Schofer
Assistant Examiner—Fred Zitomer
Attorney, Agent, or Firm—Kenneth P. Glynn

[57] ABSTRACT

Novel amphoteric acrylic and methacrylic copolymers are described comprising cationic units of pendant N-substituted amidine and anionic units of acrylic or methacrylic acid and/or acidic groups carried by substituents of N-acrylamide, N-methacrylamide, N-acrylamidine or N-methacrylamidine. One preferred embodiment is a copolymer in which at least some types of functional groups are organized in blocks. Particularly preferred are blocks of pendant nitrile groups. Preferred compositions have the said N-substituents of the amides and/or amidines containing polar groups other than primary amines. Particularly preferred polar groups are tertiary amines, quaternary ammonium salts, hydroxyls and sulfonic acid. These copolymers may optionally be convalently or physically crosslinked and swellable rather than soluble in water. A method of preparing said amphoteric acrylic and methacrylic copolymers is described comprising the reaction of selected polymers with a multitude of pendant CN groups in mutual 1,3 positions with a primary amine in presence of water. One preferred method is the reaction of CN groups with the primary amine and water in the presence of a solvent of the said polymer and/or in the presence of a basic catalyst. The particularly preferred embodiment is a reaction of CN groups containing polymer dissolved in a mixture of the polymer solvent, a primary amine, water and an optional basic catalyst.

11 Claims, No Drawings

HYDROPHILIC ACRYLIC COPOLYMERS AND METHOD OF PREPARATION

BACKGROUND OF THE INVENTION

1. Field of the Invention

The present invention is directed to hydrophilic amphoteric polyacrylates and a method of preparation. More specifically, these polymers have cationic units located relatively close to the polymer backbone to enhance desirable properties of the polymers. The method of preparation involves reactions of continuous sequences of specified active groups in 1,3 mutual positions with mixture of a primary amine and water.

2. Prior Art Statement

Hydrophilic polymer derivatives of acrylic or methacrylic acid cover a broad range of compositions including salts of polyacrylic acid or polymethacrylic acid, polyacrylamide, N-substituted polyacrylamides or polymethacrylamides, poly (acrylhydroxamic acid) and so forth. The polymers of useful properties are usually copolymers of various combinations of monomers including hydrophilic monomers derived from acrylic and/or methacrylic acids. Such monomers are typically combined either with other hydrophilic co-monomers (such as with other acrylates and/or methacrylates, with vinyl pyrrolidone, with vinylsulfonic acid, styrene sulfonic acid etc.) or with hydrophobic co-monomers (such as alkyl acrylates or methacrylates, styrene. methylstyrene, vinylpyrridine, etc.) The number of possible combinations is too large to name them all, but the great many of them are generally well known to those skilled in the art. Because many derivatives of acrylic and methacrylic acids are similar in many respects, the terms "acrylic derivatives" and "acrylic copolymers" and "acrylic", as used herein shall mean both "acrylic" and "methacrylic" unless stated otherwise.

The most known varieties of hydrophilic polyacrylates and polymethacrylates can be found, for instance, in the following publications:

Philip Molyneux: Water-Soluble Synthetic Polymers, Volumes I and II; CRC Press, Inc., Boca Raton, Fla. (1987);

Nikoloas A. Peppas (Ed.): Hydrogels in Medicine and Pharmacy, Volumes I to III; CRC Press, Inc.

Joseph D. Andrade (Ed.): Hydrogels for Medical and Related Applications; American Chemical Society, Washington, DC (1976)

The copolymers have various molecular arrangements. Some of them are random, such as those manufactured by direct copolymerization of the respective co-monomers. Others may be grafted onto various backbones, such as starch or cellulose; they may have block structure, alternating structure, etc. These polymers and copolymers may also be crosslinked either covalently or by physical interactions between pendant functional groups or by both.

Depending on the crosslinking and polymer composition, the hydrophilicity of acrylic polymers can range in very broad limits; if expressed as equilibrium ratio of the imbibed water to polymer, it can range from about 0.01 (such as polyacrylonitrile) to 1000 (such as crosslinked polyacrylic acid) to infinity (such as in water-soluble polyacrylate salts or polyacrylamide).

Hydrophilic polymeric acrylates and methacrylates play many useful roles in areas of medical devices, pharmaceutical formulations and drug delivery, separation methods in the biomedical industry, in diagnostics, in water treatment, in flocculation, in drag reduction, in cosmetic and personal care products, oil and mining industries, agriculture and many other areas.

This broad applicability implies need for very different compositions and polymer properties. For this reason, there is a continuing search for new polymers with new functional groups, new combinations of old functional groups and new arrangements of groups (block copolymers, alternating copolymers, etc.) which can show benefits for various applications.

In addition to copolymers with neutral, anionic and cationic groups there is a need for so-called amphoteric polymers carrying both anionic and cationic groups in the same polymer chain. Such groups are capable of mutual interactions which provide the polymer with certain special properties: pH dependent swelling, pH dependent crosslinking, etc. For instance, polymers of this class form internal salts at certain well defined pH called isoelectric point. In this respect, amphoteric acrylates are analogous to many proteins and other natural polymers.

The presence of both positive and negative charges on the same chain also provides numerous possibilities of useful interactions with other charged polymers, such as proteins.

One limitation of the current amphoteric polyacrylates is that all hitherto cationic units have their cationic group carried by relatively long pendant groups rather far from the polymer backbone. This distance is known to limit the effect of the charge on swelling and other useful properties. The interactions between charged distantly pendant groups have different character and consequences than interactions between groups which are closely adjacent to the polymer backbone.

Acrylate and methacrylate copolymers can be synthesized by various methods. The method used for the polymer manufacture affects not only the manufacturing costs, but also the polymer structure which, in turn, affects the polymer properties.

The most usual method is copolymerization of the respective co-monomers which, in most cases, leads either to random or to alternating copolymers.

Another of the possible routes to hydrophilic acrylates or methacrylates is chemical modification of another acrylate or methacrylate polymer. Hydrolysis, esterification, transamidation, etc. of acrylic and methacrylic esters and amides are well known to those familiar with this field. Very often the structure and properties of copolymers made in this way differ from those of copolymers of the same composition but made by direct copolymerization.

Some of the possible polymer modifications are reactions of polyacrylonitrile (hereinafter "PAN") or polymethacrylonitrile (hereinafter "PMAN"). The terms PAN and PMAN include both pure polyacrylonitrile and polymethylacrylonitrile, as well as copolymers of at least 85 molar % of acrylonitrile and methacrylonitrile with various co-monomers. Both PAN and PMAN are available and relatively inexpensive polymers.

PMAN is a somewhat less polar and more chemically stable polymer than PAN and PMAN also has the highly polar pendant CN groups in mutual 1, 3 positions. It can also be copolymerized with up to 15 molar % of other monomers without losing its properties important for the present invention. The reactions of PAN and PMAN are typically based on hydrolysis of pendant nitrile group which can yield either primarily amide units or primarily acid units, depending on catalysis (amides are prevailing at acidic catalysis and carboxylates at alkaline catalysis).

Such hydrolysis can be carried out in bulk (heterogeneous reaction in which PAN or PMAN is dispersed in a liquid containing water and a catalyst), in solutions of suitable solvents, or in solvent swollen gels of varying physical nature and consistency. Such reactions are described in the literature as typified by the disclosure of U.S. Pat. No. 3,926,930 to T. Ohfuka et al entitled "Hygroscopic Acrylic Synthetic Fibers and Method for Preparing Same" or U.S. Pat. No. 3,200,102 to H. Kleiner entitled "Process for the Production of Hydrolyzed Acrylonitrile Polymers." If reaction conditions are suitably selected, the hydrolytic reaction of CN groups proceeds via so called "zipper mechanism" which yields multiblock copolymers. The advantage of the multiblock copolymers is that they form very strong hydrogels with water content controllable in wide limits; highly swellable gels are useful as emulsifiers, thickening and viscoelastic agents and thixotropic additives; as absorbents of water, etc.

Zipper hydrolysis of PAN is mostly carried out in solutions. The acid catalyzed reaction is typically done in solutions or gels of inorganic acids, as described, for instance, in the following U.S. Pat. Nos. 4,337,327 (Jun. 29, 1982), 4,379,874 (Apr. 12, 1983), 4,420,589 (Dec. 13, 1983) and 3,897,382 (Jul. 29, 1975).

The base-catalyzed solution hydrolysis of PAN is carried out in aqueous rhodanide solutions as described in U.S. Pat. No. 4,107,121 (Aug. 15, 1978) to Stoy, entitled "Ionogenic Hydrophilic Water-Insoluble Gels from Partially Hydrolyzed Acrylonitrile Polymers and Copolymers, and a Method of Manufacturing Same. Other known reactions of nitrile groups can also be applied to PAN of PMAN, such as hydrazinolysis, alcoholysis and so on yielding the respective derivatives of polyacrylic acid In solutions of PAN or PMAN, these nonhydrolytic reactions are known to yield typically random copolymers rather than the more useful block copolymers. The block copolymers can be produced by reacting PAN in a special, so called aquagel state (AQG). This AQG state and its reactivity are described in recent U.S. Pat. No. 4,943,618 to V. Stoy, J. Lovy and G. Stoy (Jul. 24, 1990) entitled "Method for Preparing Polyacrylonitrile Copolymers by Heterogeneous Reaction of Polyacrylonitrile Aquagel."

Notwithstanding the state of the art as described above, the particular compositions of the present invention are neither taught nor rendered obvious thereby.

SUMMARY OF THE INVENTION

Novel amphoteric acrylic and methacrylic copolymers are described comprising cationic units of acrylic or methacrylic acid and/or acidic groups carried by substituents of N-acrylamide, N-methacrylamide, N-acrylamidine or N-methacrylamidine. One preferred embodiment is a copolymer in which at least some types of functional groups are in blocks. Particularly preferred are blocks of pendant nitrile groups. Preferred compositions have the N-substitutes of the amides and/or amidines containing polar groups other than primary amines. Particularly preferred polar groups are tertiary amines, quaternary ammonium salts, hydroxyls and sulfonic acids. These may optionally be covalently or physically crosslinked and swellable rather than soluble in water. A method of preparing said amphoteric acrylic and methacrylic copolymers is described comprising the reaction of selected polymers with a multitude of pendant CN groups in mutual 1,3 positions with a primary amine in the presence of water. One preferred method is the reaction of CN groups with the primary amine and water in the presence of a solvent of the said polymer and/or in the presence of a basic catalyst. The particularly preferred method is reaction of CN groups containing polymer dissolved in a mixture of the polymer solvent, a primary amine, water and an optional basic catalyst.

DETAILED DESCRIPTION OF THE INVENTION

Particularly useful hydrophilic polyacrylic derivative copolymers of the present invention comprise both anionic units and cationic units in each polymer chain.

The anionic units being selected from the following Group A comprising:

a) acrylic acid and acrylic acid salts of the general formula (I):

where R' is H or an alkyl group and M is a cation such as hydrogen, a metal or a nitrogen-containing base such as an amine;

b) N-substituted acrylamide or methacrylamide groups of the general formula (II):

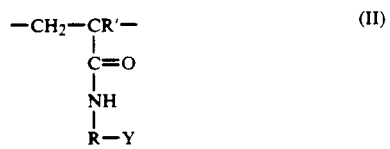

where R' is H or an alkyl and R is an organic substituent with at least one carbon and Y is COOM, —SO₃M or —OSO₃M in which M is a cation such as hydrogen, a metal or a nitrogen-containing base such as an amine.

The cationic groups are selected from the following Group B comprising acryl- or methacrylaminidines of the general formula (III):

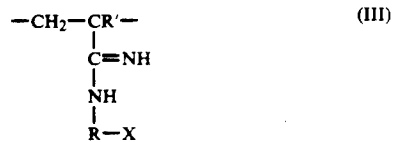

where R' is H or an alkyl and R is an organic substituent with at least one carbon atom and X is H or a non-ionic or ionic substituent.

The character of the substituent X in formula III above is not particularly essential for the invention in general, although some may be preferred for specific applications. The preferred non-ionic substituents may be oxygen-containing substituents such as —OH, or —OR, an ester, a saccharide or an epoxide. They may be alkyls of 4 to 24 carbon atoms. Another preferred non-ionic substituent X is silicone containing substituent such as —[Si(R₂)—O]ₙ—SiR₃ where n is 0 to about 100 and R is an alkyl with 4 to 24 carbons. ther possible non-ionic substituents X are nitro- or nitroso groups; lactone groups; lactame groups; nitrile groups, and many others.

The cationic groups X in formula III above may be primary, secondary or tertiary amines and their salts, salts of quaternary bases; pyrridine or naphtyridine derivatives; guanidines, amidines, etc.

The anionic groups X in formula III above may be $-COOM$, $-SO_3M$, $-OSO_3M$ or $-OPO_2OM$ in which M is a cation such as hydrogen, a metal or a nitrogen-containing base (such as an amine).

In addition to the units from both Group A and Group B, the copolymers according to the present invention can contain blocks of acrylo or methacrylonitrile units such as acrylonitrile unit, acrylamide units, units derived from esters of acrylic acid, etc. Particularly preferred are the copolymers of multiblock character containing residual CN-containing units in sequences or blocks. Such copolymers have outstanding mechanical properties at lower water content and capability to emulsify oils at high water content.

Content of the residual CN-containing units can be between about 10 and 90 molar % to provide hydrogel or associative properties to the copolymer.

The basic chemical characteristic of the present invention is simultaneous presence of chain anionic units from the Group A and cationic units from the Group B in each polymer chain. Because of their strong mutual interactions, they affect the copolymer properties already at very low concentrations (as low as 1 molar %, but more typically more than about 5 molar %).

Important polymer properties are controlled by the status of the interactions between the anionic and the cationic units, which, in turn, depend primarily on the presence of other ions, such as $H_3O^+$ or $OH^-$.

The anionic and cationic groups co-exist in three basic configurations which depend primarily upon pH:

1) Amidine-acid internal salt; if these are the only anionic and cationic groups present in the polymer, this salt is formed at the isoelectric point (IP) i.e. at pH=IP;

2) Free base amidine, carboxylate salt (e.g. sodium) at pH>IP;

3) Amidine salt (e.g. hydrochloride) and acidic carboxyl at pH<IP;

The pH at isoelectric point (known as "IP") is an important characteristic of the amphoteric polymer of the present invention. At this pH there is maximum frequency of intra-polymer interactions between ionic units, and minimum frequency of their interactions with external ions. Accordingly, the polymer in this state has a minimum solubility and/or swelling in water. The existence of the state with the minimum swelling is a substantial advantage for the product manufacturing and purification as well as for some of its uses. The existence of the internal salts is also probably responsible for the high hydrolytic stability of the N-substituted amidine group in the polymers of the present invention. Without the stabilizing effect of the acidic group in the same polymer chain, the amidine group could be expected to be much less stable than actually observed.

pH at the IP depends on the balance between anionic and cationic groups in the polymer. The copolymers with a molar excess of acidic groups and/or stronger acidic groups than their basic counterparts tend to have and IP in the acidic region. Conversely, copolymers with an excess of basic groups and stronger bases tend to have an IP in the alkaline region.

The copolymers according to the present invention may have a molar excess of either component, thus having isoelectric points at either alkaline or acidic pH. The isoelectric point can be adjusted for pH between about 2 and 10. The molar ratio between the N-substituted amidine and the respective acidic groups can vary from about 1:20 to about 20:1, but preferably from about 1:10 to about 10:1.

Particularly important among acidic groups is the carboxyl of acrylic or methacrylic acid which is attached directly to the polymer backbone. The ratio between amidine groups and acrylic acid carboxyl groups is from about 1:10 to about 10:1, but preferably from about 1:5 to about 5:1. The polymer can also contain other anionic or cationic groups in the pendant substituents. Their concentrations and molar ratios affect the position of the IP and other polymer properties.

Although the copolymers according to the present invention are substantially hydrophilic, the presence of hydrophobic moieties can impart certain important properties to them. Such moieties can improve mechanical properties due to the hydrophobic interactions. They can also improve emulsification properties of the polymer. These hydrophobic moieties are typically pendant non-polar substituents attached to acrylic or methacrylic units via amide, amidine or ester bonds. Such non-polar groups can be aromatic, hydroaromatic, aliphatic, halogenated aliphatic alkylsiloxane groups, etc. Most typically, the non-polar groups may be alkyls with 4 to 24 carbons.

Another aspect of the present invention is the method yielding the present invention copolymers, which comprises the reaction of continuous sequences of CN groups in 1,3 mutual positions with mixture of a primary amine and water, preferably in the presence of water-miscible solvents of the CN-containing polymer. This reaction yields in one step both acrylic and methacrylic acid units from Group A as well as N-substituted amidines from Group B. In addition, the reaction also yields stable N-substituted amides. The N-substituents in amidines and amides can be utilized as carriers of various functional groups, including additional anionic and cationic groups. The reaction proceeds with measurable rates even at low ambient temperatures, even though for practical manufacturing, an increase in temperature is desirable for increasing the reaction rate. There is no inherent upper limit on the reaction temperature other than decomposition temperature of the polymer, which is about 200° C. The practical limit is somewhat lower, e.g. 150° C. at which competing hydrolysis of CN becomes significant. The preferred reaction temperature is lower than about 125° C. at the vapor pressures of the reaction mixture. As long as somewhat longer reaction times are acceptable, lower temperatures are of advantage since the side reactions are suppressed and the block character of the product is improved under such conditions. The preferred reaction temperatures are between about 20° C. and 100° C., and even more preferably between about 40° C. and 80° C.

This reactivity of polymers with 1,3 CN substituents at lower temperatures is surprising because the reactivity of an isolated CN group under similar conditions is very low. In the presence of water and a basic catalyst (such as NaOH or an amine), the reaction of CN is known to yield plain amide in the first step and carboxylate in the second.

Even more surprising, the reaction between the 1,3, nitriles and primary amines can be accelerated by strong aqueous bases such as sodium hydroxide. While the reactions between 1,3 CNs and primary amines can be run at the pH of the free-base primary amine, the reaction can be accelerated by the presence of a basic catalyst such as an alkali metal hydroxide or carbonate, ammonia, a secondary or tertiary amine, or a quaternary ammonium base.

The hydrolysis of CN groups does not compete significantly with the main aminolytic reaction even under these conditions. In contrast, presence of aqueous base would accelerate hydrolysis and would further suppress the aminolysis in case of reactions of isolated CN groups.

In these polymers with multiple 1,3 CN groups, the base accelerates addition of the primary amine instead. It is sometimes advantageous to use ammonia generated by the reaction as the basic catalyst. In such a case, the reaction is carried out in an enclosed container so that ammonia cannot escape from the reaction mixture.

The reaction proceeds particularly smoothly if the CN-bearing polymer is dissolved in a mixture of a polymer solvent, the primary amine, water and, optionally, a basic catalyst. The solvent has to be highly polar and water miscible. Preferred solvents for the reactions of the present invention are concentrated aqueous solutions of certain inorganic salts which are known to dissolve PAN and similar polymers. Examples of such salts are lithium bromide, magnesium perchlorate, sodium, potassium or calcium thiocyanate, etc.

The result of the reaction under such conditions is the formation of multiblock copolymers in which the residual CN groups are organized in continuous sequences or blocks. Such block structures have numerous advantages over random copolymers, including better mechanical properties in the hydrogel state, higher emulsification efficiency in the dissolved state, etc. The reaction can be stopped by coagulation of the polymer by an excess of water or a water-miscible coagulation liquid and/or by extraction and/or neutralization of the residual primary amine and/or the basic catalyst (if present). It is an advantage for the reaction control if the primary amine is present at a relatively low concentration with respect to the CN groups. Ideally, the amine should be initially present only in a small excess so what is its expected consumption for the desired conversion so that the reaction slows down as the composition approaches target values.

The reaction can be carried out with a single primary amine, a mixture of primary amines or several primary amines can be reacted with the CN-containing polymer consecutively.

Because of the "zipper mechanism" of the solution reaction the consecutive addition of amines may lead to structures where various substituents are organized in continuous sequences rather than randomly distributed along chains. For instance, one can react most of the CN groups with a highly polar primary amine (such as monoethanol amine) in the first step, and then react residual blocks of CN groups with a highly non-polar primary amine such as 1-dodecyl amine. The resulting segmented copolymer makes a very efficient polymeric emulsifier.

Another example may be a reaction in which the polymer is first reacted in the presence of an alkaline catalyst but in the absence of any primary amine. Hydrolysis of the nitrile group forms blocks containing major parts of carboxylate units. The residual blocks are then reacted with a primary amine such as N,N-dimethyl aminopropylamine to form blocks with tertiary amino pendant groups.

The tertiary amino groups can be further quaternized by a suitable alkylation agent, such as methyl iodide or dimethyl sulphate. The interaction of anionic and cationic blocks forms special kinds of polyelectrolyte complexes.

In a more general way, the reaction conditions and the mode of the reaction (i.e. order of co-reagent addition) can be used to control sequential composition of the polymer product.

It is often preferred if at least one of the reactive primary amines has, in addition to its primary amino group, another highly polar group which is not a primary amine. Such a group can be hydroxyl, carboxyl, sulfo group, sulfamino group, tertiary amine, a nitrogen-containing heterocyclic group, quaternary base or salt, poly (ethylene oxide) etc.

The polymers may sometimes have a tendency to cross-link at some reaction conversion, particularly if the concentration of the polymer in solution is high or if the reaction is carried out on an undissolved polymer (e.g. on AQG). This crosslinking can be utilized if increased shape stability, insolubility, etc. of the product is desired. It can also be utilized for in-mold reactions where article shaping and chemical modification are achieved in a single production step.

In another preferred embodiment, the covalent crosslinking during the reaction can be achieved if at least one of the reacting amines has two or more reactive primary amino-groups which can then cause crosslinking by reacting with CN groups in different polymer chains. examples of such amines are tetramethylene diamine, hexamethylene diamine and so forth.

The reactions to practice the present invention require a polymer with a multitude of CN groups in mutual 1,3 positions such as in formula IV as follows

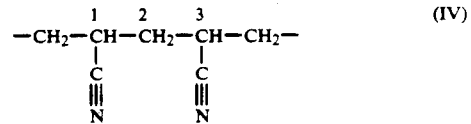

whereas reactions of isolated CN groups or multiple CN groups react very differently. These CN-containing polymers can be PAN or PMAN homopolymers. They may also be random copolymers of acrylonitrile or methacrylonitrile with other co-monomers. Even when the concentration of the comonomer is as high as 50 molar %, there are still enough CN groups in mutual 1,3 positions left to achieve a significant concentration of amidines and anionic groups. More typically, the concentration of non-CN comonomers is kept below about 15 molar % for optimum results.

If a copolymer is to be used as a starting point, it is preferably a block, multiblock or a grafted copolymer of acrylonitrile or methacrylonitrile which has continuous sequences of 1,3-CNs regardless of the overall CN concentration. One preferred acrylonitrile copolymer of this kind is a multiblock copolymer of acrylonitrile formed by alkali- or acid-catalyzed hydrolysis of PAN. Another preferred copolymer of this kind is a copolymer of acrylonitrile or methacrylonitrile grafted on a suitable substrate polymer such as starch, cellulose or polyvinylalcohol.

There are also various other combinations and varieties of polymers containing multiple pendant 1,3 CN groups which are generally well known to those skilled in the art.

The amphoteric acrylic and methacrylic copolymers according to the present invention are generally useful as hydrogels, water-absorbent polymers, emulsifiers, flocculants, complexing agents, sorbents and sorbent binders etc., depending on equilibrium water content, specific composition, crosslinking and so on.

In the hydrogel form, the copolymers of the present invention can be useful for products such as contact lenses, implants, wound dressings, cultivation and separation media, catheters, drug delivery systems and other applications.

In the highly swelling forms, the copolymers of the present invention can be used as associative thickeners, gellants, water absorbers, additives, emulsifiers, etc.

Some specific uses are mentioned in the following Examples which are meant to illustrate rather than define and limit the scope of the present invention.

EXAMPLE 1

854.43 g of 15% solution of poly-(acrylonitrile) (PAN) (Mw-150,000) in 55% aqueous NaSCN was thoroughly homogenized with 73.7 g of monoethanolamine (MEA) dissolved in 427.2 grams of 55% aqueous NaSCN.

(Molar ratio of $-CN$:MEA is a 2, PAN concentration in reaction mixture is 9.46% w/w). Reaction mixture was kept in oven at 60° C. for 24 hours. The warm reaction mixture was then mixed with crystalline NaCl in various proportions (ratio of reaction mixture: NaCl was 1:2, 1:3, 1:4, 1:5 and 1:6 [w/w]) and the pasty mix was filled into semi-opened molds (Petri dishes). The mix was cooled down and coagulated with cold water. After coagulation in water and complete washing of NaCl and other salts, hydrogel sponges of varying porosity were obtained. The sponges can be used as absorptive sponges for body fluids, as wound dressing etc.

The polymer was covalently crosslinked, as established by insolubility in 55% aqueous NaSCN. The crosslinking obviously took place during the coagulation and/or washing steps.

The polymer composition was estimated from NMR analysis as the following:

Residual CN groups: 52% mol. %

(The character of the CN signals indicated continuous sequence of CN groups rather than their random distribution).

Amidine groups: 9% molar
COOH groups: 7% molar
Amide groups (both substituted and plain): 32 mol %

EXAMPLE 2

Cold reaction mixture from EXAMPLE 1 was spread on a horizontal glass plate by a doctor's blade and then coagulated by immersion in excess of 2% sulfuric acid. The membranes of thickness from 0.5 to 3 mm had water content around 80% by wt. and smooth surface. The hydrogel is well permeable to aqueous solutes and its swelling is stable in water and shows very low sensitivity to pH and salt concentration.

Alternatively, foils, membranes or tubings from the hydrogel can be made by extrusion of the reaction mixture through a nozzle of appropriate shape into the coagulation liquid. The hydrogel articles made this way can be used as wet dressings, dialytic membranes, etc.

EXAMPLE 3

974.4 g of 15% PAN solution in 55% aqueous NaSCN was mixed with a solution of 84.1 g MEA in 149.9 g 55% aqueous NaSCN so that the molar ratio of $-CN$:MEA$=2$ and final PAN concentration in the reaction mixture was 12.1% w/w.

Several vessels were divided into two groups:

GROUP 1 was completely filled with the reaction mixture, then sealed so that there was no free space left above the solution;

GROUP 2 was filled to 50% with the reaction mixture, and then closed by lid to prevent most of the evaporation.

All vessels were kept in an oven at 60° C.-Group 1 was sealed all the time, while Group 2 was opened from time to time to vent off ammonia vapors.

After 6.5 hrs, the reaction mixture in both Groups is dark red to brown liquid which can be readily casted and coagulated to form hydrophilic membranes. There is little difference between the two Groups at this conversion.

After 22 hrs of reaction time, the viscosity of the mixture in both Groups increased, but apparently more so in the Group 1. The membranes coagulated from the solution in Group 1 swell more than membranes from Group 2. This difference can be attributed to higher concentration of ammonia in Group 1, and lower in the vented solutions of Group 2.

After 40 hours of reaction, mixture in the vented vessels of Group 2 is crosslinked to rubbery matter, while the mixture in the sealed vessels of Group 1 are still liquid and castable to membrane form. The polymer from Group 2 has lower reaction conversion than the polymer from Group 1 coagulated after the same time.

The crosslinked composition can be converted to strong, highly swellable hydrogel by washing in the water. The crosslinking allows for coagulation to an undistorted shape with good surface quality. Hence, the co-lateral crosslinking during the aminolysis can be utilized for molding in properly designed molds.

Chemical composition of all products after 6.5, 22 and 40 hours (as directed above) was analyzed by C NMR spectroscopy. Samples swollen in 55% aqueous NaSCN were measured under conditions allowing quantitative evaluation of spectra.

It was found that all polymers contain MEA-substituted amidines and smaller concentration of carboxyles. Besides, polymer contains also amides (most of them MEA-substituted) and blocks of unreacted poly-(acrylonitrile) chains.

The composition indicates that in all cases the aminolysis is the main reaction in this process.

This simple experiment demonstrates several points:
1) Amination reaction can be accelerated by a relatively weak base such as ammonia;
2) The base catalyses aminolysis preferentially over hydrolysis;
3) Base catalysts such as ammonia can suppress the crosslinking; the crosslinking can take place only if the ammonia is allowed to escape;
4) The co-lateral crosslinking can be utilized for molding of shaped articles.

EXAMPLE 4

229.1 g of 15% solution of PAN (MW=150,000 Dalton) in 55% aqueous NaSCN was thoroughly homogenized with solution of 2.12 g of hexamethylene diamine (HMDA) in 108.2 g 55% aqueous NaSCN (molar ratio of PAN/HMDA=36, final conc. of PAN in reaction mixture was 10% by weight).

100 grams of the above mix is mixed with 200 grams of the reaction mixture from Example 1 and then diluted with additional 55% aqueous NaSCN to PAN concentration 6.0% by weight.

This low-viscosity mixture is then poured into excess of kerosene and heated to 110° C. under reflux while stirring for 4 hours. After this time the slurry was cooled down and the crosslinked particles separated by sedimentation. Thorough stirring yields spherical particles of crosslinked hydrogel swelling with more than 90% of water and containing MEA-substituted amidines, carboxyles, MEA-substituted amides, low concentration of unsubstituted amide and nitriles (as established by $^{13}C$ NMR analysis).

The Hydrogel particles of this kind are generally useful for covalent enzyme immobilization, for embolization, for gel or affinity chromatography and so forth.

EXAMPLE 5

3725 g of 15% PAN in 55% aqueous NaSCN was well homogenized with a solution of 527.2 g of taurine, (2-aminoethyl sulfonic acid), 168.5 g NaOH and 1166.8 g 55% NaSCN aqueous solution. The molar ratio of taurine:PAN=0.4, the final concentration of PAN in reaction mixture is 10% w/w). pH of mixture is in alkaline region, and taurine is present as sodium salt with free base primary amino group. Slight excess of NaOH acts as catalyst of the aminolysis. Mixture was stirred in jacketed reactor at 70° C. for 24 hrs and then coagulated into excess of water to form fibrous mass. (The coagulation can be carried out also in form of pellets, tubing, foil, hollow fiber etc. The shape of the coagulate is matter of shape of extrusion nozzle and other arrangements which are not directly related to our invention. After complete washing the material is a mechanically strong hydrogel containing over 90% w/w of water. It is not covalently crosslinked and can be repeatedly dissolved in suitable solvents, such as aqueous NaSCN or dimethylsulfoxide (DMSO), and recoagulated into a different shape. Chemical analysis reveals nitrile groups in continuous 1, 3 sequences; small concentration of non-substituted amides and amidines, and moderate concentration of COOH. The main hydrophilic groups are

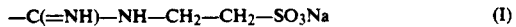

$$-C(=NH)-NH-CH_2-CH_2-SO_3Na \qquad (I)$$

and N-substituted amides

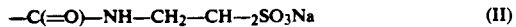

$$-C(=O)-NH-CH_2-CH-_2SO_3Na \qquad (II)$$

Slightly higher swelling is observed for acid form of the copolymer where intra-molecular interactions are less pronounced (amidines as salts, sulfo-group as dissociated acid, carboxyl as undissociated acid).

EXAMPLE 6

2189 g of 15% PAN (Mw=155,000) in 55% NaSCN was homogenized with solution of 542.3 g of taurine, 173.4 g of NaOH in 1094.8 g of 55% NaSCN (molar ratio of taurine/PAN=0.7, final PAN conc. 8.21%).

Mixture was stirred in jacketed reactor at 73° C. for 73 hours and then coagulated into water. NaSCN and taurine were washed out thoroughly by deionized water (DIW). One part of swollen polymer dried as the sodium salt, the other part was of coagulate and was acidified with 5% sulfuric acid, washed and dried as acidic form. Composition of the polymer was as follows:

| | |
|---|---|
| CN groups | 33 mol % |
| N-substit. amides and amidines (I and II) | 45 mol % |
| carboxylates | 14 mol % |
| non-substituted amides and amidines | 8 mol % |

Dried polymer (both in the acid and Na salt forms) were dispersed in DIW to prepare 1% slurry in water. The slurry had consistency of thixotropic gel. The gel was used as base for emulsion in which the polymer according to our invention was the only emulsifier.

The slurry was mixed with an oil (mixed glyceryl esters of lauric and palmitic acids) at different gel:oil ratios (from 90:10 to 50:50 by weight), and mixed for 1 minute in high-speed blender. Stable, water-dilutable emulsions were obtained in all cases, but emulsifying performance of the acid form was found to be somewhat better then that of the sodium form in the emulsion resistance to so called "creaming".

In additional experiment, 0.2 weight parts of dodecylamine was added to 100 parts of the 1% polymer slurry in acid form, and boiled for about 2 hours. The slightly turbid gel thus formed was capable to form stable emulsions with various oils and in a broad range of oil concentrations. Stability of emulsions to creaming was improved. It is believed that at least part of the dodecylamide reacted with residual nitrile groups to form N-dodecyl amidine which improves emulsification capability of the product. Main part of dodecylamine is counter-cation to -SO$_3$H group.

EXAMPLE 7

The same reaction procedure as in Example 6 was used, except the reacting polymer was random copolymer of acrylonitrile with 7 mol. % of methylacrylate and Mw=110,000 Daltons.

The reaction was stopped by coagulation into excess of methylalcohol (MeOH) instead of into water. The precipitated polymer was kept overnight in wet MeOH (cca 5–10% of water). The precipitate was then extracted on a Soxhlet extractor with MeOH and the polymer dried. Polymer with Na form of taurine was used to prepare emulsions of water and triglyceride oil.

EXAMPLE 8

1517.7 g OF 15% PAN in 55% aqueous NaSCN was well homogenized with the solution of 219.5 g of N, N-dimethylaminopropylamine (DMAPA) and 4.30 g of NaOH in 758.9 g of 55% aqueaous NaSCN. Molar ratio of DMAPA:PAN was 0.5 molar ratio of NaOH:DMAPA was 0.05. The final concentration of PAN in reaction mixture 9.11% w/w. Reaction mixture was kept in a sealed beaker in water bath at 47°–48° C. for 14.5 hrs Temperature of the reaction mixture was monitored during the reaction. The exothermic reaction of PAN with amine caused the temperature in the middle of beaker to increase to 55° C. (at its maximum). Also, the viscosity of the mixture went through its maximum during the first 8 hrs. of the reaction. After 14.5 hrs. of heating, the mixture was coagulated in an excess of water to form fibers. The coagulate was thoroughly washed with water. Completely washed polymer contained cca 90% of water. After drying, the polymer was pulverized. The polymer has both amidine groups and the tertiary amino groups in N-substituted amidines and amides; the carboxyl groups create internal salts with these cationic groups. The molar ration of cationic to anionic groups was about 2:6. Accordingly, the polymer had minimum of swelling in alkaline region (about pH=8.5). The composition of the polymer (in molar %) was the following:

| | |
|---|---|
| CN units (most in 1.3 positions) | 41.3 |
| —C(=NH)NH(CH$_2$)$_3$N(CH$_3$)$_2$ (III) and —C(=O)NH(CH$_2$)$_3$N(CH$_3$)$_2$ (IV) | 36.3 |
| —C(=O)NH$_2$ | 4.5 |
| —C(=O)OH | 17.9 |

The polymer was prepared in its form of minimum swelling, but it could be made readily swellable in water by neutralization with hydrochloric or phosphoric acids. It can be then used as thickener, emulsifier etc. It was also used for further reactions on the pendant groups.

EXAMPLE 9

1504.6 g of a 15% solution of PAN in 55% aqueous NaSCN was mixed a with solution of 217.6 g of DMAPA in 752.3 g 55% aqueous NaSCN. The reaction mixture was distributed into two beakers:

A. Completely full beaker covered with plastic foil with no free space between the cover and the solution;

B. Beaker filled to about 50% of volume, with about half of volume of free space between the cover and the solution.

Both containers A and B with the reaction mixture were kept in the same water bath at 47°–48° C. for 16.5 hours. The reaction temperature of the mixture was monitored during the reaction. The exothermic temperatures increase was steeper in the beaker A than in the beaker B (maximum temperature was cca 53.5° C. and cca 50° C. resp.) but less steep than in the experiment of the Example 8. Viscosity increase was moderate in the beaker A where no free space was above solution (the mixture was not crosslinked and could be coagulated at any conversion). Viscosity increased more steeply in the beaker B and the mixture became dark, crosslinked gel.

The polymer from the beaker A had similar composition as result of Example 8, albeit with lower conversion (higher nitrile concentration). The product in beaker B was not analyzed because of the crosslinking.

This comparison indicates that base presence accelerates the aminolytic reaction of nitriles, and perhaps also decomposition of intermolecular amidines, responsible for crosslinking (according to our reaction mechanism hypothesis). Ammonia, which is evolved during aminolysis, acts as catalyst causing acceleration of the reactio and supression of the crosslinking.

EXAMPLE 10

50 g of dry polymer from Example 7 was swollen in a solution of 36 g of diethylsulfate (molar ratio of dimethylamino group in polymer to diethylsulfate is 1:1) in 200 cc of methylalcohol. The mixture was kept for at 50° C. for 20 hours. The methanol was then evaporated and the pulverized powder of quarternized polymer washed with acetone. Resulting product had the following composition, in weitht %:

| | |
|---|---|
| Nitriles | 17.9% |
| Quarterized DMAPA-substitute units: | 29.7% |
| Non-quarterized DMAPA-substituted units (III) & (IV) | 23.0% |
| Unsubstituted amides and carboxyles: | 13.1% |
| monoEthylSulfate counter-anion: | 16.3% |

This polymer was used to prepare stable emulsions of various oils (e.g. a triglyceride oil and a permethyl hydrocarbon), as thickener etc.

EXAMPLE 11

26 g of the product of EXAMPLE 8 was swollen in a solution of 16.5 g of dodecylamine in 60 g methylalcohol. The mixture was kept at 50° C. for 138 hours. Then the mixture was diluted with 100 cc of isopropylalcohol and 10 cc of water and left for 24 hrs. at room temperature. Swollen polymer was extracted 2x 24 hrs. with acetone and dried. The product turned hydrophobic and does not swell in water if neutralized with a small amount of sulfuric acid. This is due to the high concentration of dodecyl-substituted amidines and amides. Concentration of dodecyl-group can be easily controlled by the concentration of dodecylamine, the reaction time and the temperature. Products with lower concentration of dodecyl groups are hydrophilic and are highly efficient emulsifiers, while the products with higher dodecyl-groups concentration can be used as lubricants etc.

EXAMPLE 12

229.01 g of a 15% solution of PAN in 55% aqueous NaSCN was thoroughly homogenized with a solution of 2.12 g of HMDA in 108.2 g of 55% aqueous NaSCN. Molar ratio of PAN/HMDA=36, final concentration of PAN in reaction mixture was 10% w/w. Mixture was poured onto Petri dishes and the dishes sealed with plastic foil. The reaction mixture in Petri dishes was kept in an oven at 60° C. for 20 and 40 hrs. The solution crosslinked into transparent, rubbery mass. The crosslinked solution was washed with water until all NaSCN was extracted. The polymer in the form of transparent aquagel with water content between 68% to 70% w/w was prepared (for both reaction times). This polyacrylonitrile aquagel with N-substituted amidine and N-substituted amide cross-links and with small concentration of carboxylic groups can be used as base for silicone polyacrylate-containing interpenetrating networks useful for rigid gas-permeable contact lenses (such as those described in the co-pending U.S. Patent Application).

The amidine and carboxylate groups improve hydrophilicity of the final lens without causing detrimental side-effects (such as loss of shape stability).

EXAMPLE 13

Multiblock copolymer containing 55 molar % acrylonitrile and about 43 mol. % acrylamide (both units being organized in blocks) can be prepared by acid-catalyzed hydrolysis of PAN as described in U.S. Pat. No. 4,943,618, Example 6. 15% of this copolymer is dissolved in 55% aqueous NaSCN and mixed with solution of DMAPA in 55% aqueous NaSCN so that final polymer concentration is 10% w/w and molar ratio of DMAPA to CN is 1:2. This mixture is heated in full enclosed container for 16 hours to about 50° C. The reaction is then terminated by coagulation of polymer in excess of water. The polymer is washed and dried.

The resulting product is multiblock copolymer having blocks composed of acrylamide-units, and blocks containing DMAPA-substituted amidines, DMAPA-substituted amides, and acrylic acid units. The product can be used as additive to shampoo, as precursor to quarternized block polymer additive for cosmetic formulations and as gelling agent in combination with anionic polymers (e.g. with polyacrylic acid or product of Example 5).

EXAMPLE 14

Block copolymer product from Example 5 is swelled in water and alkalized with NaOH to pH=8.5, then is added molar excess of DMAPA (1 wt. part per 1 wt. part of the copolymer).

The slurry is thoroughly mixed and heated for 3 hours to 95° C. in a closed container. The reaction mixture is then cooled and resulting copolymer is precipitated in acetone. The copolymer has blocks comprising taurine-substituted amides and amidines and having prevailing anionic character; and blocks containing DMAPA-substituted amides and amidines with prevailing cationic character. Such block copolymer is able to form polyelectrolytic complexes of hydrogel character.

EXAMPLE 15

15% solution of poly-(methyacrylonitrile) (PMAN) in 55% aqueous NaSCN is mixed with solution of DMAPA in 55% aqueous NaSCN so that final concentration of polymer is about 10% and molar ratio of nitrile groups to DMAPA is 2. Reaction mixture is heated in a full, closed container to 50° C. for 20 hours. The reaction is then terminated by coagulation into excess of water. Polymer is then washed with water and dried. Product can be used similarly as polymer described in EXAMPLE 8.

What is claimed is:

1. A block copolymer, which comprises:

A hydrophilic amphoteric block copolymer having a block polymer backbone selected from N-substituted acryloamides, N-substituted methacryloamidines, N-substituted acryloamidines, N-substituted methacryloamidines, and mixtures of these, and having cationic groups and anionic groups attached to said backbone, wherein the cationic groups are of the general formula:

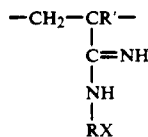

wherein R' is H or an alkyl groups; R is an organic substituent with at least one carbon atom and X is H, and further wherein said polymer backbone has pendant nitrile groups formed in sequences in mutual 1, 3 positions.

2. The copolymer of claim 1 wherein said anionic group is a carboxyl group.

3. The copolymer of claim 2 wherein said carboxyl group is directly attached to the polymer backbone.

4. The copolymer of claim 1 wherein said anionic groups are of the formula:

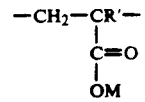

wherein R' is H or an alkyl group and M is hydrogen, a metal or a nitrogen-containing base.

5. The copolymer of claim 1 wherein said anionic groups are acrylamide or methacrylamide groups of the general formula:

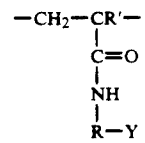

where R' is H or an alkyl and R is an organic substituent with at least 1 carbon and Y is —COOM, —SO₃M or —OSO₃M in which M is a cation such as hydrogen, a metal or a nitrogen-containing base, such as an amine.

6. The copolymer of claim 1 wherein said substituent X is an alkyl with 4 to 24 carbons.

7. The copolymer of claim 1 wherein said substituent X is a cationic substituent selected from the group consisting of primary, secondary and tertiary amines and their salts; salts of quaternary bases; pyrridine or naphtyridine derivatives; guanidines; amidines; imines; imidines.

8. The copolymer of claim 1 wherein said polymer is soluble in water and the solubility in water is limited to a temperature range above 50° C.

9. The copolymer of claim 1 wherein said solubility in water is limited to a temperature above 100° C.

10. The copolymer according to claim 1 wherein said polymers is soluble in water and the solubility in water is limited to an acidic pH range.

11. The copolymer according to claim 1 wherein said polymer is soluble in water and the solubility in water is limited to an alkaline pH range.

* * * * *